(12) United States Patent
Choi

(10) Patent No.: US 7,892,668 B2
(45) Date of Patent: Feb. 22, 2011

(54) BATTERY LOCKING APPARATUS FOR ELECTRONIC DEVICE

(75) Inventor: Seong-Woo Choi, Gunpo (KR)

(73) Assignee: LG Electronics Inc., Seoul (KR)

( * ) Notice: Subject to any disclaimer, the term of this patent is extended or adjusted under 35 U.S.C. 154(b) by 1212 days.

(21) Appl. No.: 11/468,079

(22) Filed: Aug. 29, 2006

(65) Prior Publication Data

US 2007/0048599 A1 Mar. 1, 2007

(30) Foreign Application Priority Data

Sep. 1, 2005 (KR) .................. 10-2005-0081353

(51) Int. Cl.
*H01M 2/10* (2006.01)
(52) U.S. Cl. ..................... 429/97; 429/100
(58) Field of Classification Search ........... 429/96–100, 429/123; 361/679.01; 455/128, 575.1
See application file for complete search history.

(56) References Cited

U.S. PATENT DOCUMENTS

| | | | |
|---|---|---|---|
| 5,347,163 A * | 9/1994 | Yoshimura | 307/66 |
| 5,716,730 A | 2/1998 | Deguchi | |
| 6,490,436 B1 | 12/2002 | Kaiwa et al. | |
| 6,563,927 B2 * | 5/2003 | Mote et al. | 379/433.11 |
| 2002/0160728 A1 | 10/2002 | Morita | |
| 2003/0085686 A1 * | 5/2003 | Haga et al. | 320/112 |
| 2004/0038121 A1 * | 2/2004 | Song et al. | 429/97 |
| 2004/0192418 A1 * | 9/2004 | Nam | 455/575.1 |
| 2007/0238013 A1 * | 10/2007 | Liu | 429/97 |

FOREIGN PATENT DOCUMENTS

| | | |
|---|---|---|
| CN | 1244757 A | 2/2000 |
| GB | 2303018 | 2/1997 |
| GB | 2340296 | 2/2000 |
| JP | 5-344042 | 12/1993 |
| JP | 2821427 | 8/1998 |
| WO | WO 2004021472 A1 * | 3/2004 |

OTHER PUBLICATIONS

English language Abstract of JP 5-344042.
English language Abstract Japanese Patent Publication No. JP 9-330687 A.
English language Abstract of CN 1244757 A.

* cited by examiner

*Primary Examiner*—Basia Ridley
*Assistant Examiner*—Jacob Buchanan
(74) *Attorney, Agent, or Firm*—Birch, Stewart, Kolasch & Birch, LLP

(57) ABSTRACT

An electronic device includes a main body, and a battery locking apparatus. The battery locking apparatus includes a locking unit, provided between a battery cover and the main body, which locks the battery cover to the main body; and an unlocking unit, provided between the locking unit and a battery, which provides a pushing force against the battery to unlock it from the main body.

14 Claims, 8 Drawing Sheets

BATTERY LOCKING APPARATUS FOR ELECTRONIC DEVICE

This application claims the benefit of Korean Patent Application No. 10-2005-0081353, filed on Sep. 1, 2005, which is hereby incorporated by reference in its entirety.

BACKGROUND OF THE INVENTION

1. Field of the Invention

The present invention relates to a battery locking apparatus for an electronic device, and more particularly, to a battery locking apparatus that unlocks a battery cover and a battery from an electronic device with a single push operation.

2. Description of the Related Art

A mobile terminal, such as a mobile phone or personal digital assistant (PDA), is a type of mobile electronic device that allows a user to perform wireless communication, or read or process information, while traveling.

To enable mobile use of a mobile terminal, the mobile terminal is powered by a battery, either an external pack type or an internal pack type. In an external pack type battery, a battery cell is integrally formed with a cover of the mobile terminal, whereas in an internal pack type battery, the battery cell and the cover are two separate components.

An internal pack type battery is more widely used than an external pack type, because it can be used with many different models of mobile terminals. On the other hand, an external pack type battery is limited to mobile terminal models which conform to the integral cover of the battery.

A conventional mobile terminal having an internal pack type battery is described below with reference to FIG. 1.

The conventional mobile terminal 1 shown in FIG. 1 includes a terminal body 2 having a battery mounting part 3 formed on a rear surface thereof, a battery 8 which detachably mounts on the battery mounting part 3, a battery cover 10 which covers the battery 8.

The battery mounting part 3 is provided with terminals 5, which electrically connect to terminals 9 of the battery 8. A withdrawal recess 7 is formed at one side of the battery mounting part 3 to allow a user to pry the battery 8 away from the battery mounting part 3 with a finger.

Fixing protrusions 12 are formed at a lower end of the battery cover 10. The fixing protrusions 12 insert into insertion recesses 6 formed at an end of the battery mounting part 3. A locking recess 11 is formed at an upper end of the battery cover 10 to lock the battery cover 10 to the terminal body 2 with a battery cover locking device 4 provided in the terminal body 2.

FIG. 2 shows a sectional side view of the mobile terminal shown in FIG. 1. As shown in FIG. 2, the mobile terminal includes a battery cover locking device 4, which includes a latch (or detent) 14 that includes a stopping member 15 which inserts into the locking recess 11 of the battery cover 10, and an elastic member 13 (such as, for example, a spring) which provides a downward bias to the latch 14.

To mount the battery 8 in the mobile terminal, the battery 3 is first inserted on the battery mounting part 3. Next, the fixing protrusions 12 of the battery cover 10 are inserted into the insertion recesses 6. Then, the upper end of the battery cover 10 is pushed against the mobile terminal, until the stopping member 15 catches in the locking recess 11 of the battery cover 10.

To remove the battery 8 from the mobile terminal, a user first presses the latch 14 upwards until the stopping member 15 is removed from the locking recess 11. Next, the battery cover 10 is removed from the mobile terminal. Then, the user removes the battery 8 from the mobile terminal by inserting a finger in the withdrawal recess 7 and prying the battery 8 away from the battery mounting part 3.

The process described above for removing the battery 8 from the mobile terminal is inconvenient, as it requires two operations by the user, first, removing the battery cover 10 from the mobile terminal, and then, removing the battery 8 from the mobile terminal.

Further, another disadvantage of the above-described mobile terminal is that the formation of the withdrawal recess 7 in the battery mounting part 3 increases the size of the battery mounting part 3, and thus increases the size of the mobile terminal.

SUMMARY OF THE INVENTION

In view of the foregoing, an object of the present invention is to provide a battery locking apparatus for an electronic device which allows a user to conveniently remove a battery from the electronic device.

Another object of the present invention is to provide a battery locking apparatus having minimal size.

To achieve these objects, there is provided an electronic device, which includes a main body, and a battery locking apparatus. The battery locking apparatus includes a locking unit, provided between a battery cover and the main body, which locks the battery cover to the main body, and an unlocking unit, provided between the locking unit and a battery, which provides a pushing force against the battery to unlock it from the main body.

The main body may include a battery mounting part which holds the battery and has a space which allows movement of the battery. The electronic device may include an elastic connection terminal which electronically connects the battery to the electronic device when the battery is mounted to the battery mounting part. The electronic device may include a withdrawal part that pushes the battery away from the battery mounting part. The withdrawal part may include a push rod, and an elastic member which biases the push rod towards the battery.

The electronic device may include a push button configured to be pressed towards the main body, and a first stopping member formed on the battery cover which catches with the push button. The push button may include a first hook member which catches with the first stopping member. The electronic device may include an elastic member which biases the push button outwards from the electronic device.

The unlocking unit may include a first stopping jaw formed on the battery, a second stopping jaw which engages with the first stopping jaw, and a rod which pushes the battery in a direction to disengage the first stopping jaw from the second stopping jaw when the push button is pressed. The push button may include a cam member with a sloped face that pushes the rod when the push button is pressed. The electronic device may include an elastic member which returns the rod to an initial position when the push button is released.

The electronic device may include a cover locking unit which locks the battery cover, and allows the battery cover to be unlocked when the push button is pressed. The cover locking unit may include a second stopping member formed on an end of the battery, and a second hook member formed on an inner side of the battery cover which engages with the second stopping member. The electronic device may be a mobile terminal.

There is also provided an electronic device which includes a main body, including a battery mounting part that holds a battery, a battery cover, and a push-button that releases the battery and the battery cover from the electronic device when it is pressed.

A first stopping member may be formed at an upper end of the battery cover, and a first hook member, formed at a lower end of the push button, may catch the first stopping member when the battery cover is pressed against the main body. A first stopping jaw may be formed on an end of the battery, and the battery mounting part may include a second stopping jaw which engages the first stopping jaw to lock the battery to the battery mounting part. The electronic device may include a rod which pushes the battery downward such that the first stopping jaw disengages from the second stopping jaw. The rod may push the battery downward when the push-button is pressed towards the main body.

There is also provided a battery for an electronic device which includes a terminal, formed on a first end of the battery, which electrically connects the battery to an electronic device, a first stopping jaw, formed on a second end of the battery opposite the first end, which engages with a second stopping jaw in the electronic device, and a stopping member, formed on the second end of the battery, which engages with a hook member formed on an inner side of a battery cover of the electronic device.

BRIEF DESCRIPTION OF THE DRAWINGS

The present invention is described in the detailed description that follows, with reference to the following noted drawings which illustrate non-limiting examples of embodiments of the present invention, and in which like reference numerals represent similar parts throughout the drawings.

DETAILED DESCRIPTION OF THE INVENTION

Figure 1:
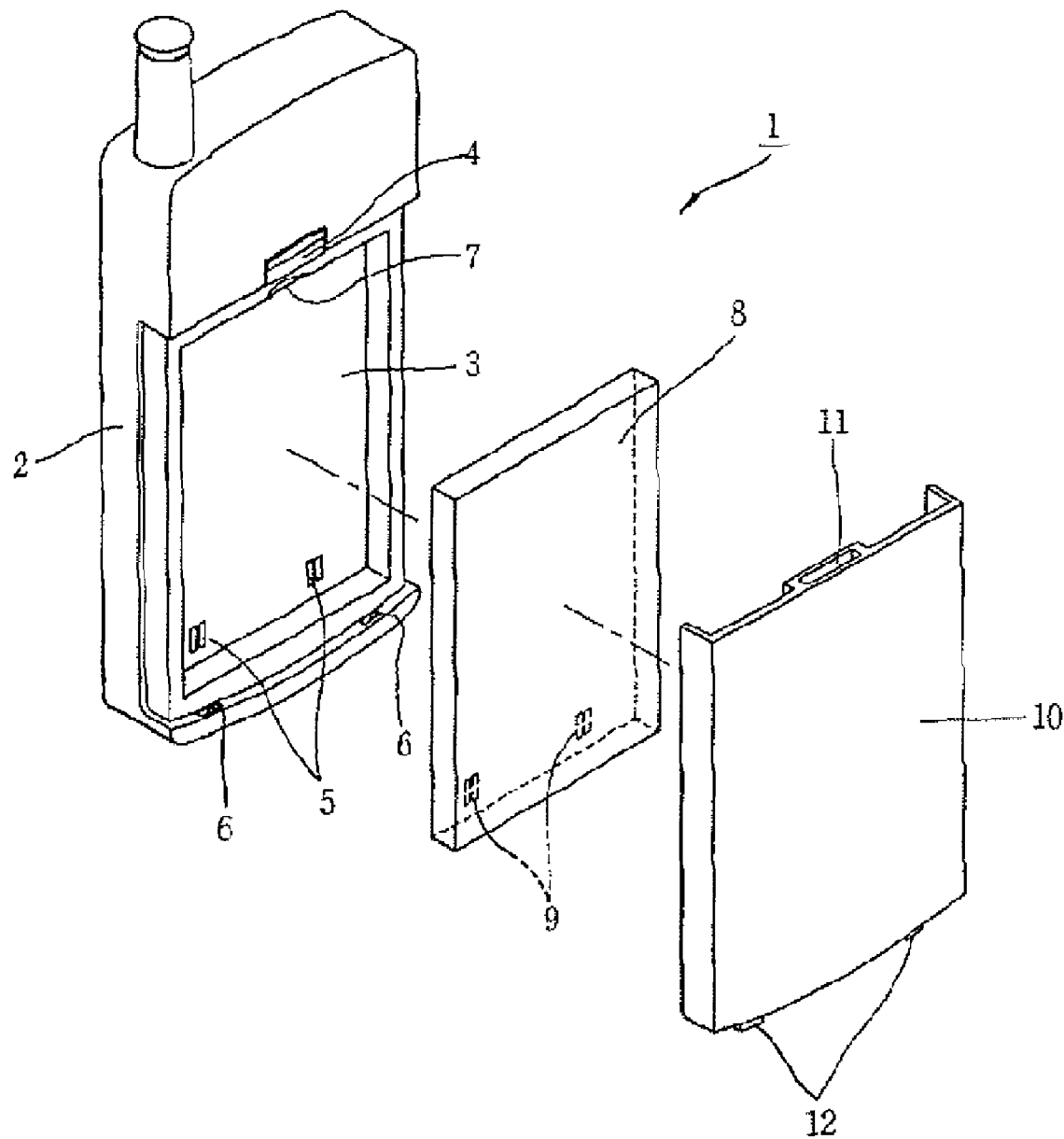
FIG. 1 is an exploded perspective view of a conventional mobile terminal.
Figure 2:
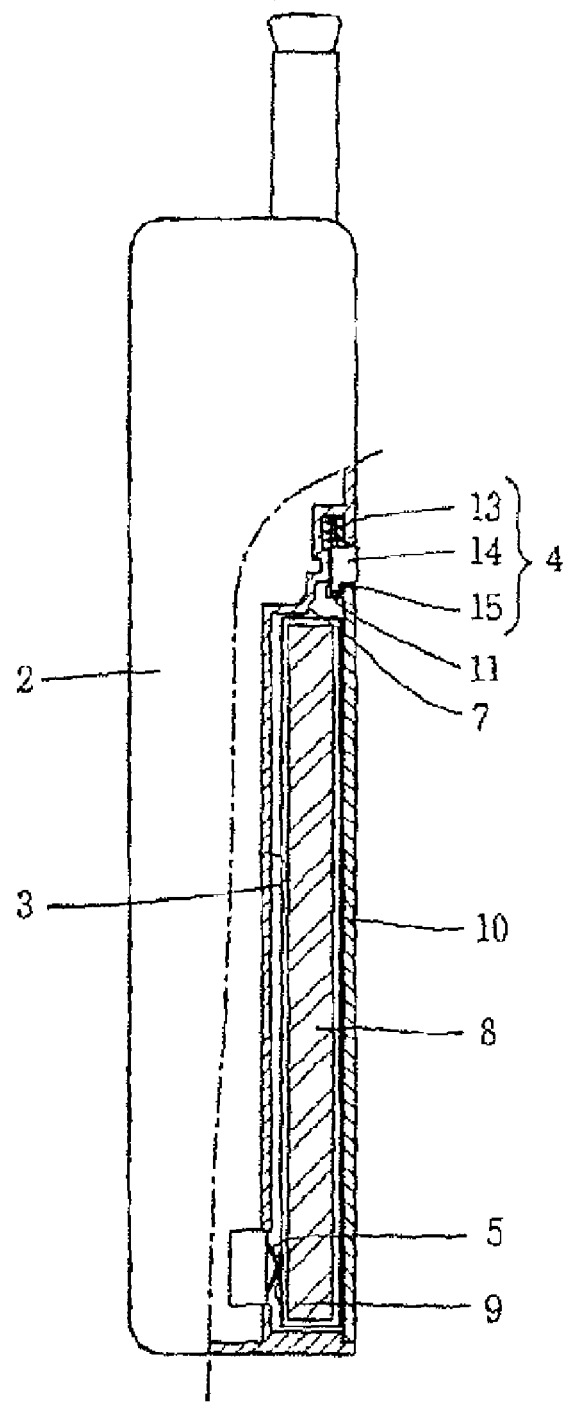
FIG. 2 is a vertical sectional view of the conventional mobile terminal shown in FIG. 1.
Figure 3:
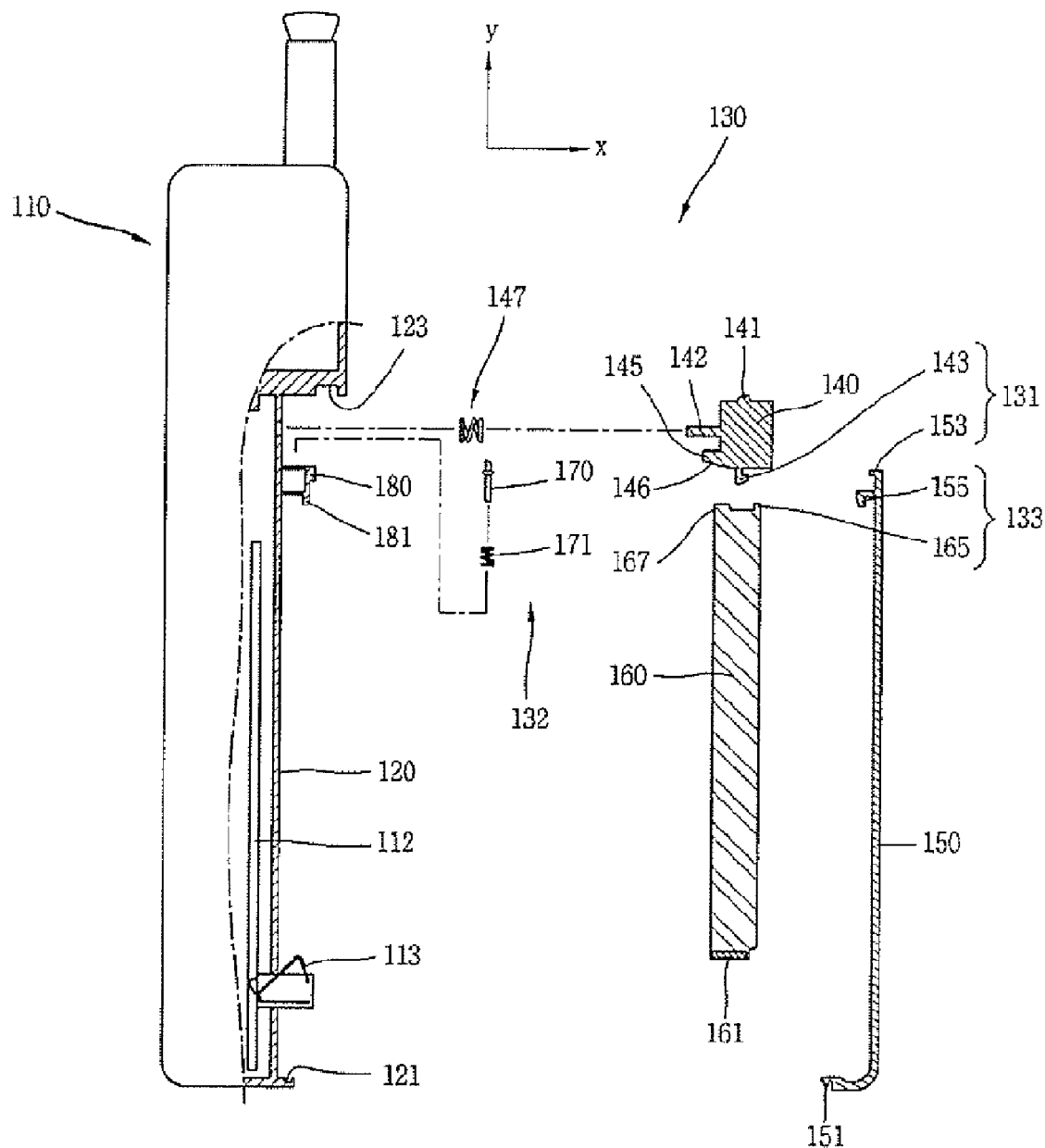
FIG. 3 is an exploded partial sectional view of an electronic device according to an embodiment of the present invention.

FIG. 3 shows an exploded view of a battery locking apparatus of an electronic device, such as, but not limited to, a mobile terminal.

The electronic device shown in FIG. 3 includes a main body 110, a battery mounting part 120 formed on a rear side of the main body 110, a battery 160 which mounts on the battery mounting part 120, a battery cover 150 that covers the battery 160, and a battery locking apparatus 130 that locks the battery 160 and the battery cover 150 to the electronic device.

The battery mounting part 120 holds the battery 160, but has a large enough space to allow the battery 160 to move in a Y-direction, shown in FIG. 3. An elastic connection terminal 113 is provided at one end of the battery mounting part 120, and contacts a terminal 161 of the battery 160 when the battery 160 is mounted to the battery mounting part 120, so as to electrically connect the battery 160 to a circuit board 112 provided within the main body 110 of the electronic device.

At least one insertion hole 121 is formed at a lower end of the main body 110, into which at least one fixing protrusion 151 formed at a lower end of the battery cover 150 is inserted. Accordingly, when the fixing protrusion(s) 151 are inserted into the insertion hole(s) 121 and the battery cover 150 is rotated upwards, an upper end of the battery cover 150 catches in the battery locking apparatus 130, which locks the battery cover 150 to the electronic device.

The battery locking apparatus 130 includes a locking unit 131 which is provided between the battery cover 150 and the main body 110 and locks the battery cover 150 to the main body 110, and an unlocking unit 132 which is provided between the locking unit 131 and the battery 160 and pushes the battery 160 in the Y-direction to unlock it from the main body 110.

A push button 140, movable in an X-direction as shown in FIG. 3, is provided at an upper end of the battery mounting part 120. When the push button 140 is pressed, the battery cover 150 and the battery 160 are unlocked from the electronic device.

The locking unit 131 includes a first stopping member 153, which is formed at an upper end of the battery cover 150, and a first hook member 143, which is formed at a lower end of the push button 140. The first hook member 143 catches the first stopping member 153 when the upper end of the battery cover 150 is pressed towards the electronic device, so as to lock the battery cover 150 to the electronic device.

The upper end of the battery 160 is locked to the terminal body 110 so that the battery 160 mounted on the battery mounting part 120 may not be moved in the vertical direction, and the locking state can be released by the unlocking unit 132.

When the battery cover 150 is locked to the electronic device with the battery 160 inside, the battery 160 is held in place by the battery mounting part 120. The battery 160 can be removed from the electronic device with the unlocking unit 132.

The unlocking unit 132 includes a first stopping jaw 167, which is formed at an upper end of the battery 160, a second stopping jaw 181, which is formed at a lower end of a rod guide 180 and engages with the first stopping jaw 167 to lock the battery 160 to the battery mounting part 120, and a rod 170, which pushes the battery 160 downward in the Y-direction to unlock the battery 160 from the battery mounting part 120 when the push button 140 is pressed.

An elastic member 147, such as a spring, is provided between the push button 140 and the main body 110, as shown in FIG. 3. A protrusion 142, formed on a rear surface of the push button 140, is provided inside the elastic member 147. The elastic member 147 biases the push button 140 outwards from the electronic device.

A guide protrusion 141 is formed at an upper side of the push button 140, and slides within a push button guide portion 123 formed in the main body 110 as the push button 140 is pressed in the X-direction.

The rod guide 180 is provided at an upper side of the battery mounting part 120. The rod 170 is provided in an insertion hole in the rod guide 180, which guides the rod 170, and is movable in the Y-direction. An elastic member 171, such as a spring, is provided inside the rod guide 180 and around the rod 170, and provides an upward bias to the rod 170. An enlarged portion 172 of the rod 170 engages an upper end of the elastic member 171 and prevents excessive upward movement of the rod 170.

A cam member 145 having a sloped face 146 is formed at a rear side of the push button 140. When the push button 140 is pushed towards the main body 110, the cam member 145 comes into contact with the rod 170. The sloped face 146 of the cam member 145 causes the rod 170 to move downwards as the push button 140 is pressed.

The battery locking apparatus 130 may also include a cover locking unit 133, which locks and unlocks the battery cover 150.

The cover locking unit 133 includes a second stopping member 165, which is formed at an upper end of the battery 160, and a second hook member 155, which is formed on an inner side of the battery cover 150 and engages with the second stopping member 165. One side of the second hook member 155 has a sloped face 156, which allows the second stopping member 165 to snap to the second hook member 155 when the battery 160 and the battery cover 150 are pressed together.

FIG, 4 is a partial sectional view of the electronic device of FIG. 3, showing how the parts are fit together when the battery 160 and battery cover 150 are locked to the electronic device. FIG. 5 is an enlarged view of a portion 'A' shown in FIG. 4.

Figure 4:
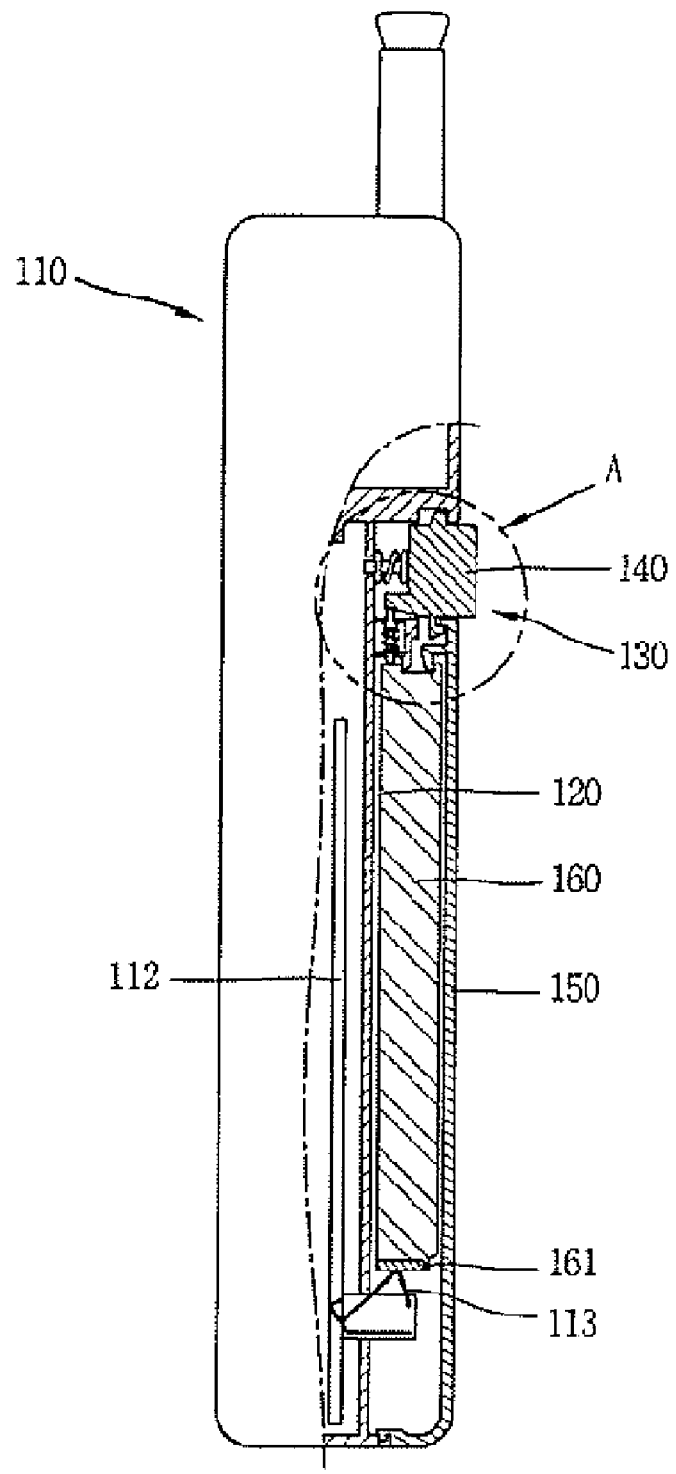
FIG. 4 is a partial sectional view of the electronic device shown in FIG. 3 when assembled.
Figure 5:
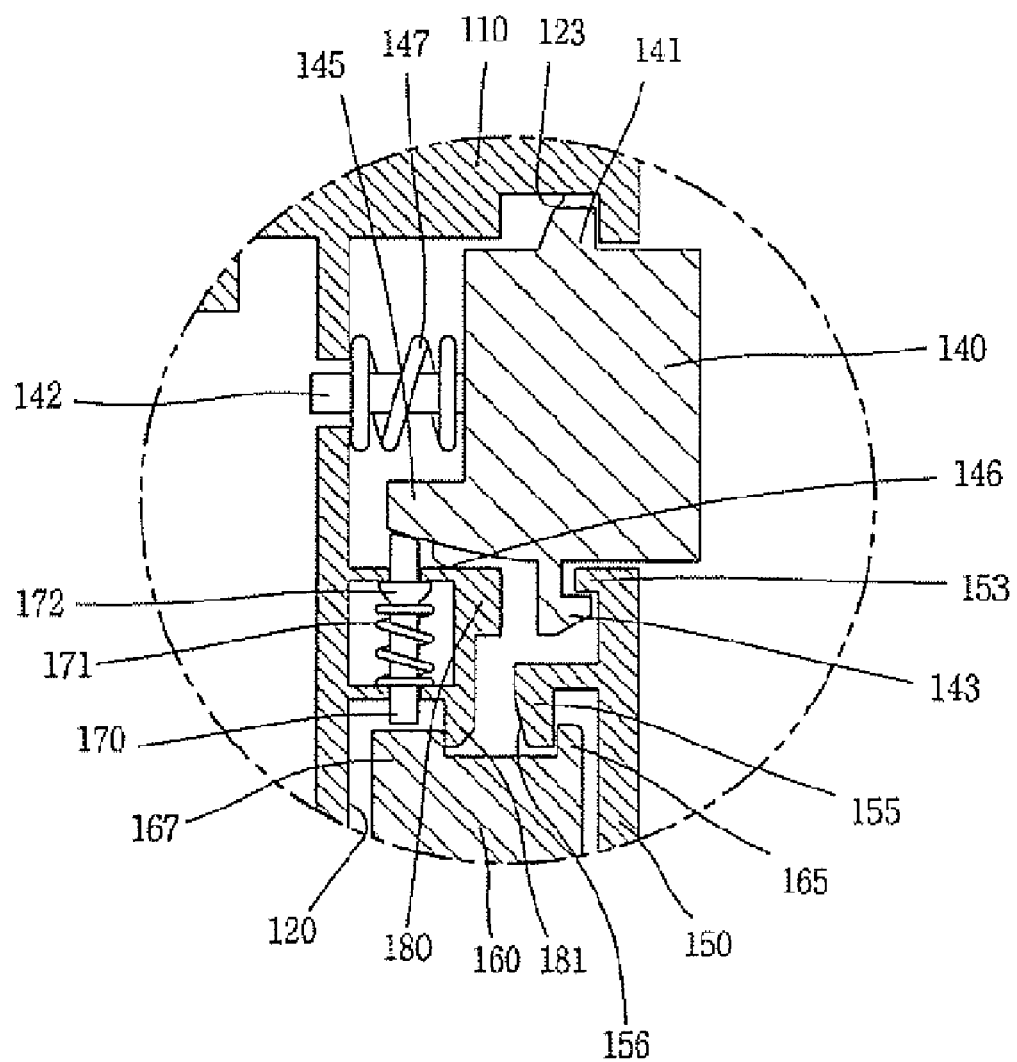
FIG. 5 is an enlarged view of a portion 'A' of FIG. 4.

As shown in FIG. 4, when the battery 160 is mounted to the mounting part 120, the battery terminal 160 is pressed against the elastic connection terminal 113, forming a stable electrical connection.

As shown in FIG. 5, the upward force the elastic connection terminal 113 applies to the battery 160 serves to hold the stopping jaw 167 of the battery 160 against the second stopping jaw 181, and hold the second stopping member 165 of the battery 160 against the second hook member 155 of the battery cover 150.

The first hook member 143 of the push button 140 is held to the first stopping member 153 of the battery cover 150 based on the force the elastic member 147 applies against the push button 140.

An operation of the electronic device shown in FIGS. 3 to 5 is described below with reference to FIGS. 6 and 7.

Figure 6:
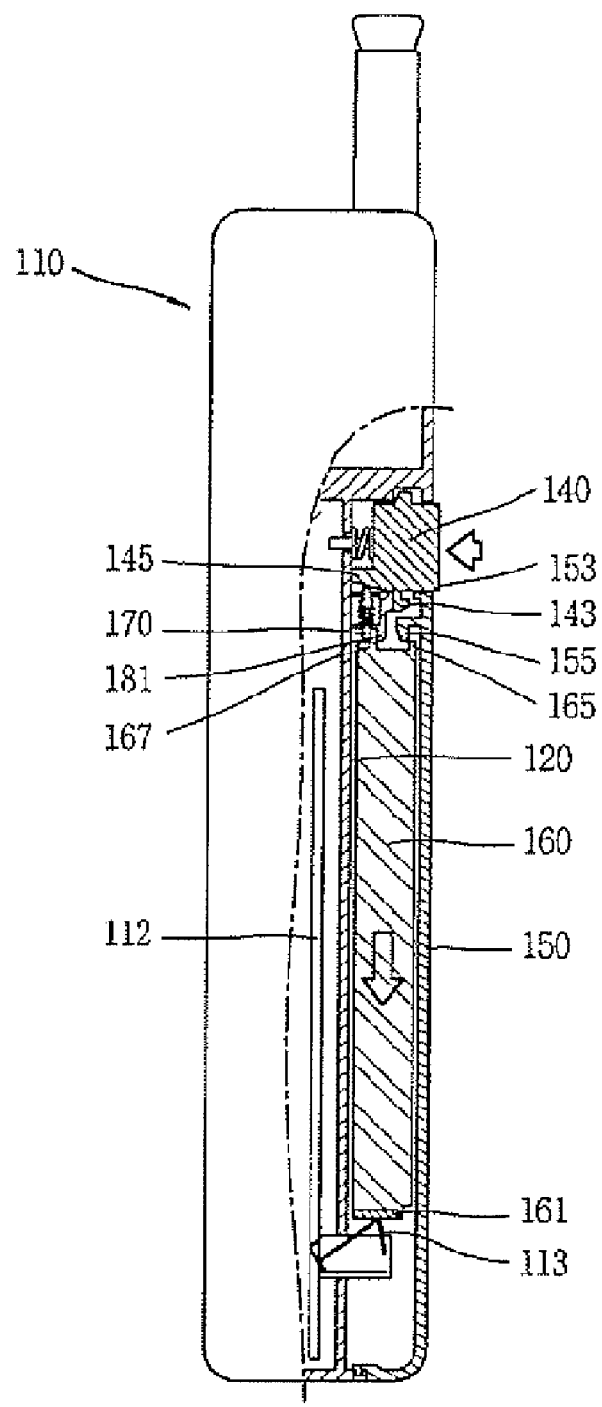
FIGS. 6 and 7 illustrate an operation of the electronic device shown in FIG. 3.

As shown in FIG. 6, when the push button 140 is pressed inward, the first hook member 143 of the push button 140 moves inward, away from the first stopping member 153 of the battery cover 150.

At the same time, as the push button 140 moves inward, the cam member 145 of the push button 140 presses the rod 170 downward The downward movement of the rod 170 pushes the battery 160 downward.

As the battery 160 moves downward, the first stopping jaw 167 of the battery 160 moves away from the second stopping jaw 181, and the second stopping member 165 moves away from the second hook member 155, thus unlocking the battery 160 and the battery cover 150.

Figure 7:
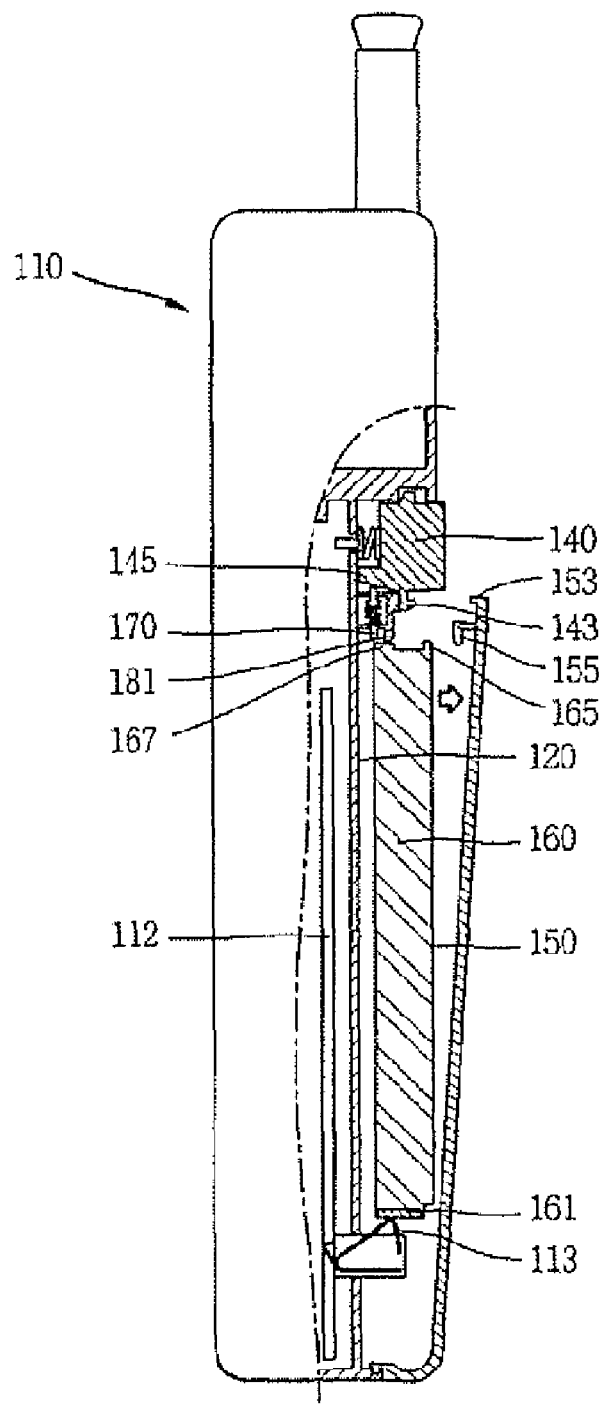

Accordingly, as shown in FIG. 7, since the first stopping member 153 and second hook member 155 of the battery cover 150 are no longer engaged with the first hook member 143 and second stopping member 165 respectively, the battery cover 150 is released from the electronic device. Further, to assist in removing the battery cover 150 from the electronic device, the electronic device may be held in a position where the rear side of the electronic device is facing downwards.

Figure 8:
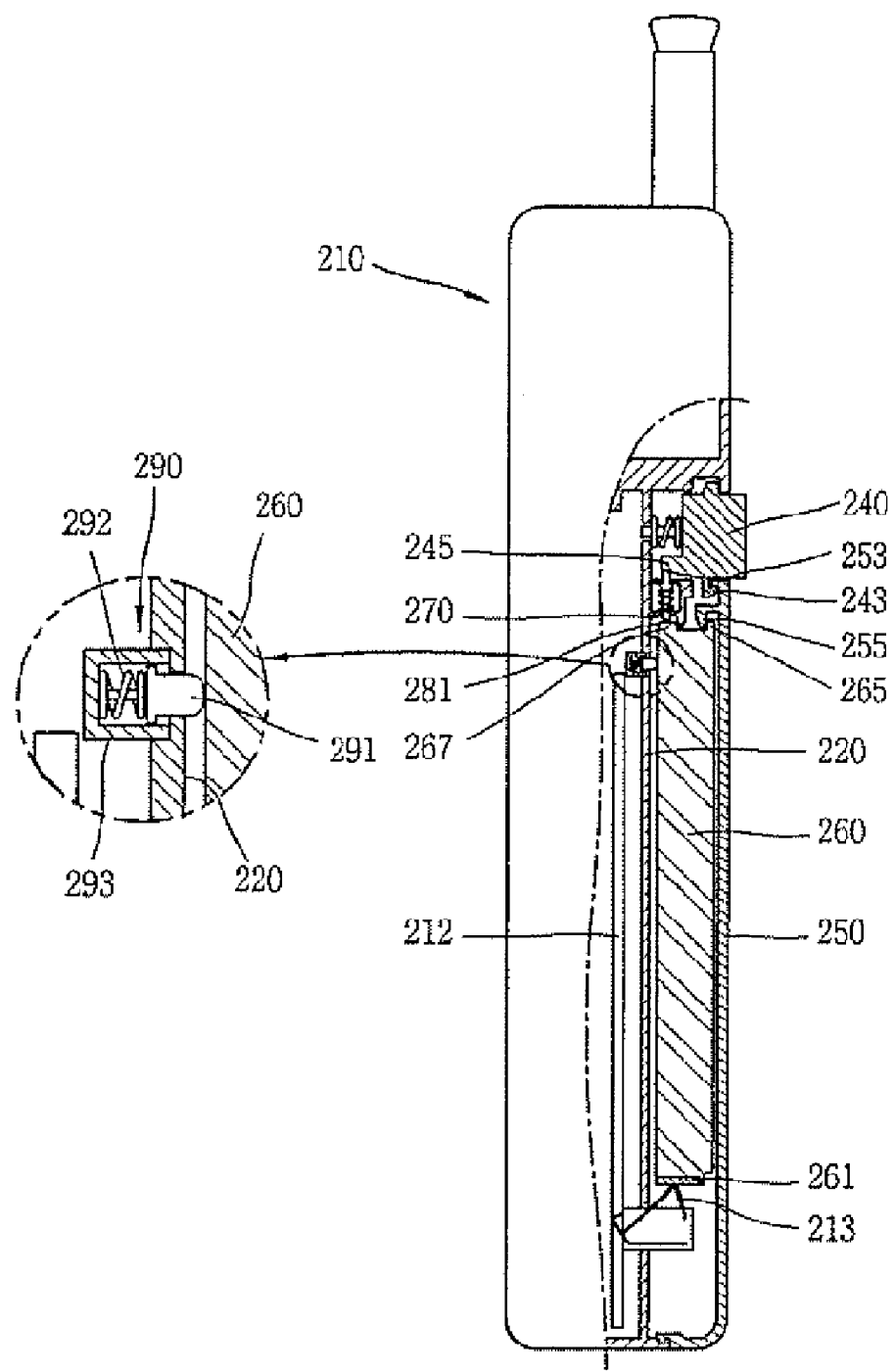
FIG. 8 is a sectional view of an electronic device according to an embodiment of the present invention.

FIG. 8 shows a sectional view of an alternate embodiment of an electronic device, in which elements similar to those of the first embodiment are numbered with the same last two digits (i.e., 140 and 240 both designate a push button).

The electronic device shown in FIG. 8 is similar to the electronic device shown in FIGS. 3-7, but additionally includes a withdrawal part 290 that pushes a battery 260 away from a battery mounting part 220, to assist in removing the battery 260 from the electronic device.

The withdrawal part 290 is mounted to the battery mounting part 220, and includes a push rod 291 and an elastic member 292, such as a spring, which biases the push rod 291 towards a battery 260 mounted in the battery mounting part 220. The withdrawal part 290 may include a compartment 293.

Accordingly, when the battery 260 and a battery cover 250 are unlocked by pressing a push button 240, the force the push rod 291 applies to the battery 260 causes the battery 260 and battery cover 250 to separate from the electronic device.

The battery locking apparatus described above provides several advantages over conventional devices.

For example, a battery and battery cover are both removed from an electronic device incorporating the battery locking apparatus by a single push of a button, which is convenient to a user.

Further, since a withdrawal recess for prying the battery away from the electronic device with a finger is not needed, the size of the electronic device may be minimized.

Further, the locking of the battery prevents its inadvertent removal, due to an impact or movement.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. An electronic device, comprising:
a main body;
a battery cover detachably coupled to the main body;

a battery disposed inside the battery cover; and a battery locking apparatus, comprising:

a push button configured to be pressed towards the main body;

a cover locking unit, provided between the battery cover and the main body, which locks the battery cover to the main body and allows the battery cover to be unlocked when the push button is pressed; and an unlocking unit, provided between the locking unit and the battery, which provides a pushing force against the battery to unlock it from the main body, wherein the unlocking unit comprises:

a first stopping jaw formed at the battery;

a second stopping jaw formed at the main body, and configured to be engaged with the first stopping jaw; and a rod movably mounted to the main body in a horizontal direction, and configured to allow the first stopping jaw to be disengaged from the second stopping jaw when the push button is pressed.

2. The electronic device according to claim 1, wherein the main body comprises a battery mounting part which holds the battery and has a space which allows movement of the battery.

3. The electronic device according to claim 2, further comprising an elastic connection terminal which electronically connects the battery to the electronic device when the battery is mounted to the battery mounting part.

4. The electronic device according to claim 2, further comprising a withdrawal part that pushes the battery away from the battery mounting part.

5. The electronic device according to claim 4, wherein the withdrawal part comprises: a push rod; and an elastic member which biases the push rod towards the battery.

6. The electronic device according to claim 1, further comprising:

a first stopping member formed on the battery cover which catches with the push button.

7. The electronic device according to claim 6, wherein the push button comprises a first hook member which catches with the first stopping member.

8. The electronic device according to claim 6, further comprising an elastic member which biases the push button outwards from the electronic device.

9. The electronic device according to claim 6, wherein the push button comprises a cam member with a sloped face that pushes the rod when the push button is pressed.

10. The electronic device according to claim 6, further comprising an elastic member which returns the rod to an initial position when the push button is released.

11. The electronic device according to claim 6, wherein the cover locking unit comprises:

a second stopping member formed on an end of the battery; and a second hook member formed on an inner side of the battery cover which engages with the second stopping member.

12. The electronic device according to claim 1, wherein the electronic device comprises a mobile terminal.

13. An electronic device, comprising:

a main body, comprising a battery mounting part that holds a battery;

a battery cover;

a push-button that releases the battery and the battery cover from the electronic device when it is pressed;

a first stopping jaw formed at the battery;

a second stopping jaw formed at the main body, and configured to be engaged with the first stopping jaw; and a rod movably mounted to the main body in a horizontal direction, and configured to allow the first stopping jaw to be disengaged from the second stopping jaw when the push button is pressed.

14. The electronic device according to claim 13, wherein a first stopping member is formed at an upper end of the battery cover, and a first hook member, formed at a lower end of the push button, catches the first stopping member when the battery cover is pressed against the main body.

* * * * *